July 29, 1958 L. J. HOLDER ET AL 2,845,281
HITCHES
Filed April 29, 1957 2 Sheets-Sheet 1
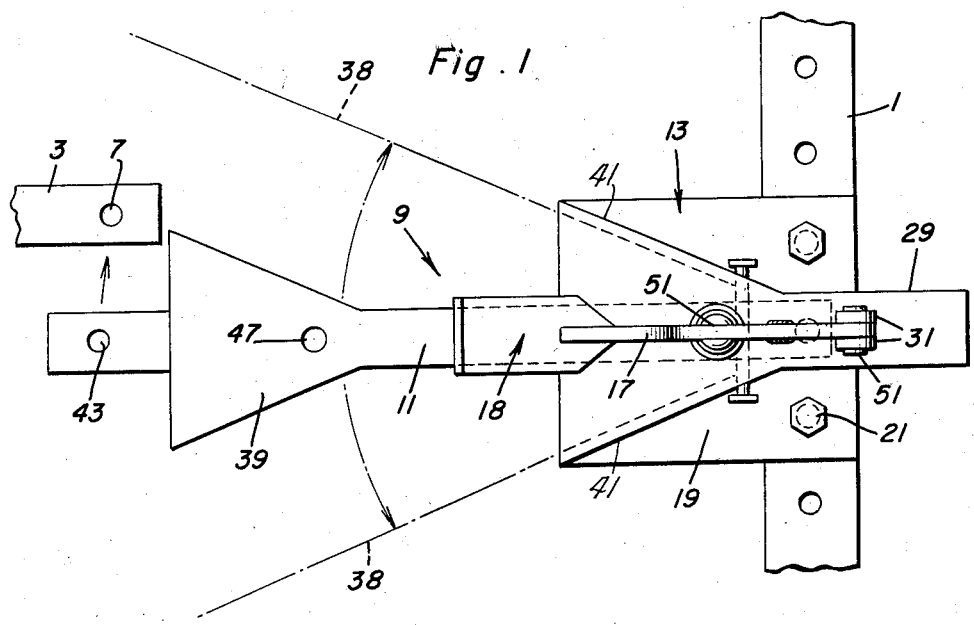
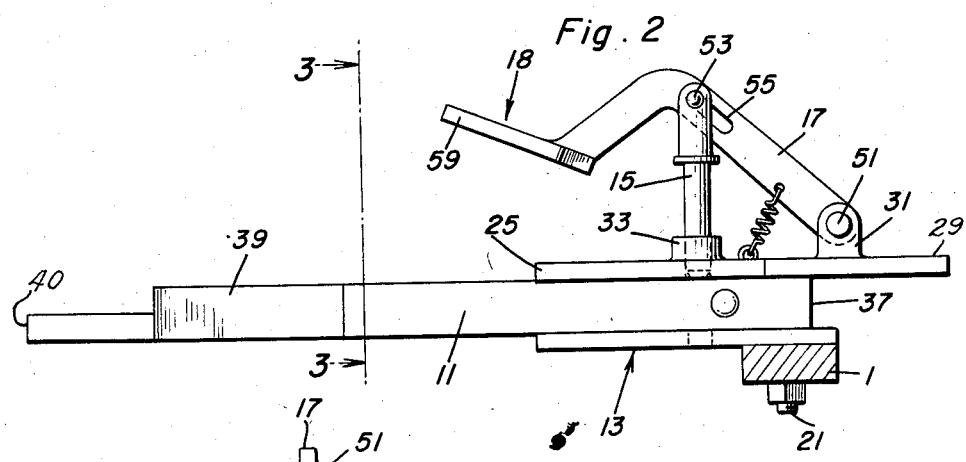
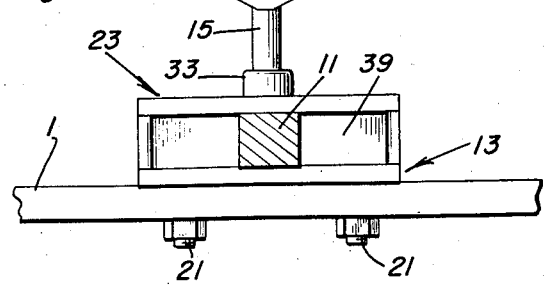
Lum J. Holder
Otis R. Green
    INVENTORS.

July 29, 1958   L. J. HOLDER ET AL   2,845,281
HITCHES
Filed April 29, 1957   2 Sheets-Sheet 2
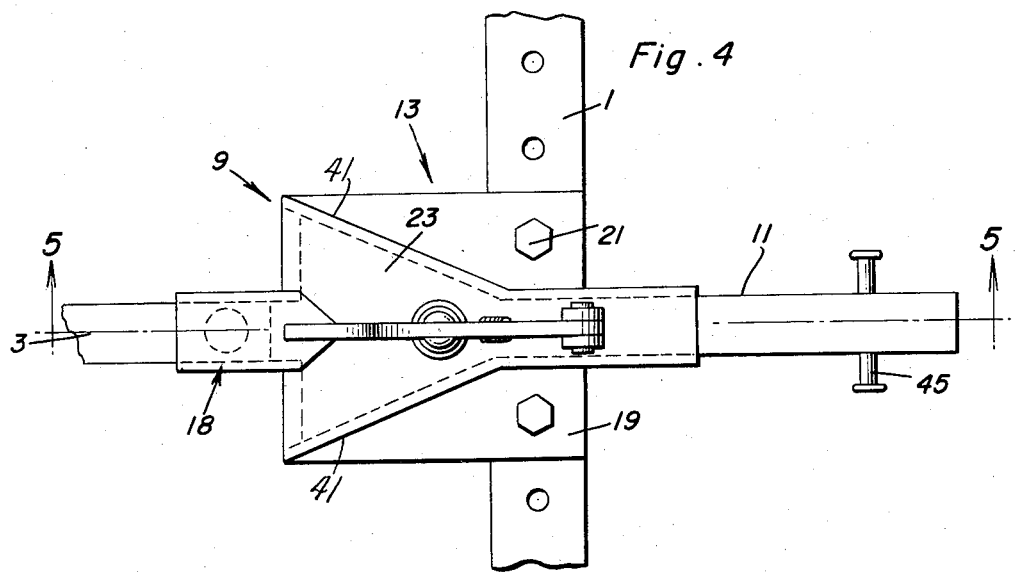
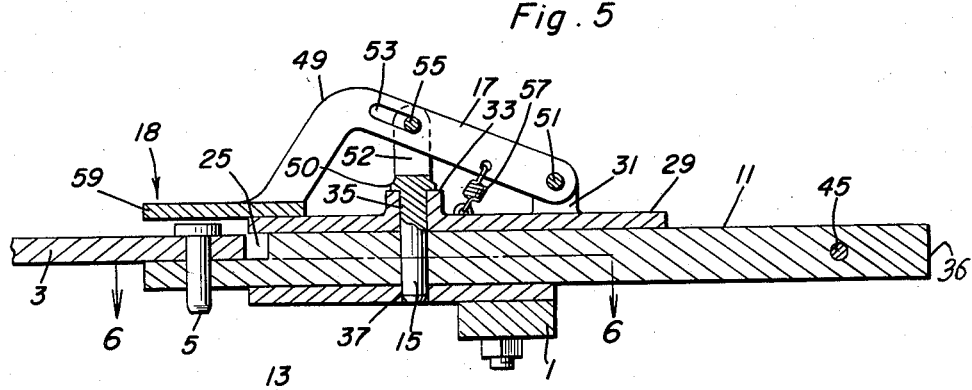
Lum J. Holder
Otis R. Green
　　　　INVENTORS United States Patent Office 2,845,281
Patented July 29, 1958

2,845,281

HITCHES

Lum J. Holder and Otis R. Green, Lamesa, Tex.

Application April 29, 1957, Serial No. 655,573

1 Claim. (Cl. 280—478)

Our invention relates to improvements in hitches for coupling farm equipment or trailers to a tow vehicle such as a tractor or a pick up truck.

The principal object of our invention is to provide a hitch having a draft tongue for hitching to a coupling pin of a hitch tongue of a farm implement, or a trailer, together with mounting means for the draft tongue attachable to the tow vehicle and in which the draft tongue is slidable rearwardly and swingable laterally to align the draft tongue with the coupling pin for coupling thereto, and means on the draft tongue and the mounting therefor for sliding the draft tongue forwardly into alignment with the tow vehicle and locking the draft tongue to the mounting in response to backing of the tow vehicle.

Another object is to provide in conjunction with the foregoing means on the draft tongue mounting for preventing the coupling pin from bouncing out of coupling position.

Still another object is to provide a hitch for the above purposes which is safe, simple in construction and inexpensive to manufacture and install on a tow vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in plan of our improved hitch with the draft tongue slid rearwardly preparatory to coupling to the hitch tongue;

Figure 2 is a fragmentary view in side elevation of the same partly in section;

Figure 3 is a view in vertical cross-section taken on the line 3—3 of Figure 2;

Figure 4 is a fragmentary view in plan of the hitch with the draft tongue coupled to the hitch tongue and locked;

Figure 5 is an enlarged view in longitudinal section taken on the line 5—5 of Figure 4; and Figure 6 is a view in horizontal section taken on the line 6—6 of Figure 5.

Referring by numerals to the drawings, our improved hitch has been shown for illustration purposes as attached to a tractor drawbar 1 for coupling to a hitch tongue 3 of a farm implement, or trailer, not shown, and by means of a coupling pin 5 insertible in an opening 7 in the hitch tongue.

The hitch designated generally by the numeral 9 comprises as its basic components, a draft tongue 11, a mounting 13 therefor attachable to the drawbar 1, a hitch pin 15 for locking the draft tongue 11 to the mounting 13, a spring tensioned lever 17 for operating the hitch pin 15 into locking position, and a holddown member 18 on the lever 17 for the coupling pin 5.

The mounting 13 comprises a rectangular plate 19 bolted, as at 21, on top of the drawbar 1 in rearwardly extending right angled central position thereon and having formed thereon in the longitudinal center thereof a socket 23 which tapers laterally forwardly and is provided with open rear and front ends 25, 27 and with a forwardly projecting top extension 29 in the longitudinal center of the socket provided forwardly of the socket 23 with a pair of laterally spaced upstanding ears 31 thereon and for a purpose presently seen. The socket 23 is formed adjacent its front end 27 with an upstanding sleeve 33 forming a vertical opening 35 in the top of the socket vertically aligned with an opening 37 in the bottom of said socket 23 for receiving the hitch pin 15. As will be understood the socket 23 is adapted to be longitudinally aligned with the longitudinal center of a tow vehicle.

The draft tongue 11 comprises a rectangular bar of any desired length longitudinally slidable forwardly in the socket 23 into an advanced position to project forwardly out of the same and longitudinally slidable rearwardly to project rearwardly out of the socket into a retracted position in which the front end 36 of the draft tongue 11 is withdrawn into the socket 23. In its retracted position the tongue 11 is laterally swingable in the socket a limited degree established by the sides of the socket 23, as illustrated by the lines 38 in Figure 1.

A forwardly tapering wedge section 39 on the draft tongue 11 adjacent its rear end 40 is slidable into the socket 23 in the advanced position of the tongue 3 for coaction with the forwardly tapered sides 41 of the socket 23 to cam the tongue 11 into the longitudinal center of the socket 23 and into alignment with the longitudinal center of a tractor or other tow vehicle, not shown. The rear end 40 of the draft tongue 11 rearwardly of the wedge is provided with an opening 43 for registering with the opening 7 to receive the coupling pin 5 inserted through the opening 7.

A transverse stop pin 45 in the draft tongue 11 for engagement with the front end 27 of the socket 23 limits retraction of said tongue. A vertical opening 47 is provided in the wedge section 39 for receiving the hitch pin 15.

The hitch pin 15 is vertically slidable in the sleeve 33 upwardly and downwardly into unlocking and locking positions and is provided with a circumferential shoulder 50 therein seating on the sleeve 33 in the locking position of said pin 15.

A lever 17 overlying the socket 23 in the longitudinal center thereof is provided for operating the hitch pin 15. The lever is pivoted as at 51 at its front end between the ears 31 for vertical rocking for sliding the hitch pin 15 upwardly and downwardly and is operatively connected to the locking pin 15 in a bifurcated upper end 52 of the pin by a pin and slot connection 53, 55 for vertical swinging of said lever in operative connection with the locking pin 15. A coil tension spring 57 is suitably connected at its ends to the lever 17 and to the plate 19 to swing the lever 17 downwardly into locking position.

The holddown member 18 comprises a flat plate 59 on the free end of the lever 49 projecting rearwardly of the plate 19 and socket 23 and adapted to seat on the socket 23 when the lever 17 is swung downwardly.

In operating the described hitch, the hitch tongue 11 is slid rearwardly with the hitch backed to within proper position relative to the hitch tongue 3 and then swung laterally to align its aperture 43 with the aperture 7 and then the coupling pin 5 is dropped into said apertures. During this operation the lever 17 is swung upwardly initially by the holddown member 18 to raise the hitch pin 15 into unlocking position shown in Figures 2 and 5 in which it rests on said tongue 11. After the coupling pin 5 is in coupling position the hitch 9 is again backed until the socket 23 is backed over the wedge section 39 whereupon the draft tongue 11 will be cammed as described to swing the tongue 11 into alignment with the longitudinal center of the socket 23 to align said tongue with a tractor or other tow vehicle. When the draft tongue 11 is thus aligned the opening 37 and the hitch pin 15 are vertically aligned and the coupling pin 5 is beneath the holddown member 18. At this point the lever 17 is permitted to be swung downwardly by the spring 57 to thrust the hitch pin 15 into the opening 37 and lock the hitch tongue 11 and socket 23, or mounting 13 together, and such swinging of the lever 17 swings the holddown member downwardly into overlying close position relative to the coupling pin 5 to keep said pin 5 from bouncing out of coupling position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A hitch for coupling a tow vehicle to a trailing device comprising a rectangular plate attachable to the rear end of a tow vehicle with its longitudinal center aligned with the longitudinal center of the tow vehicle, a draft tongue longitudinally slidable rearwardly and laterally swingable on said plate to align the same with a coupling pin on said trailing device and longitudinally slidable forwardly and laterally swingable on said plate into alignment with the longitudinal center of said plate to align said tongue with the longitudinal center of the tow vehicle, coacting devices on said plate and tongue camming the tongue laterally into alignment with said longitudinal center of said plate in response to forward sliding of said tongue, locking means for locking the tongue to the plate when said tongue is slid forwardly and cammed into alignment with said center of the plate including a vertical socket on said plate, and holddown means on said plate for said coupling pin, said locking means comprising a locking pin slidable in said socket upwardly and downwardly into locking and unlocking position, and a vertically swingable hand lever pivoted on said socket and operatively connected to said locking pin, said holddown means comprising a holddown plate on said lever movable upwardly and downwardly thereby from and into holddown position relative to said coupling pin.

References Cited in the file of this patent

UNITED STATES PATENTS 2,654,613     Blair  ------------------- Oct. 6, 1953

FOREIGN PATENTS 586,883     Great Britain ----------- Apr. 3, 1947